United States Patent Office.

AUGUST KOTHE, OF HANOVER, PRUSSIA, GERMANY.

REMEDY AGAINST DRY-ROT AND DAMPNESS IN WALLS.

SPECIFICATION forming part of Letters Patent No. 307,055, dated October 21, 1884.

Application filed July 23, 1884. (No specimens.)

*To all whom it may concern:*

Be it known that I, AUGUST KOTHE, a subject of the King of Prussia, and a resident of the city of Hanover, Kingdom of Prussia, have invented an Improved Remedy Against Dry-Rot and Dampness in Walls, of which the following is a specification.

The present invention relates to the manufacture of a composition by the use of which the dampness of walls or masonry may be got rid of, even when the dampness arises from saltpeter being contained in the stone or other material of which the wall or masonry to be treated consists.

The composition or preparation is made by intimately mixing together the following ingredients in the several given proportions, or thereabout, taken by volume or measure— that is to say: one of heated sand; two and one-half of purified beech-wood ash; one-half slaked lime, with a little pulverized lime; one-fourth green vitriol; one-fourth linseed-oil; one-eighth sirup of sugar, and one-eighth chloride of calcium. The composition so obtained possesses the quality of attracting the moisture that may be present in its immediate vicinity. Thus if a suitable quantity of this composition be applied to the damp part of a wall, preferably by placing it within a hole or recess made in the wall for the purpose, in from four to six weeks the whole of the dampness will be eradicated, and the wall maintained permanently dry, as has been demonstrated.

I claim—

The mixture of sand, wood-ash, lime, green vitriol, linseed-oil, sirup, and chloride of calcium.

In witness that I claim this as my own I have hereunder set my hand in the presence of two subscribing witnesses.

AUGUST KOTHE.

Witnesses:
 B. ROI,
 PH. V. HERTLING.